(12) United States Patent
Smith et al.

(10) Patent No.: US 9,526,212 B2
(45) Date of Patent: Dec. 27, 2016

(54) BALER AUTOMATIC STOPPING SEQUENCE

(71) Applicant: CNH Industrial America LLC, New Holland, PA (US)

(72) Inventors: Kevin M. Smith, Narvon, PA (US); Carl M. Brewer, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 27 days.

(21) Appl. No.: 14/554,526

(22) Filed: Nov. 26, 2014

(65) Prior Publication Data

US 2016/0143225 A1    May 26, 2016

(51) Int. Cl.
    *A01F 15/08*    (2006.01)
    *A01F 15/14*    (2006.01)
    *A01F 15/07*    (2006.01)

(52) U.S. Cl.
    CPC ............... *A01F 15/08* (2013.01); *A01F 15/07* (2013.01); *A01F 15/0875* (2013.01); *A01F 15/141* (2013.01)

(58) Field of Classification Search
    CPC .................................. A01F 15/07; A01F 15/08
    See application file for complete search history.

(56) References Cited

U.S. PATENT DOCUMENTS

| | | | | |
|---|---|---|---|---|
| 4,674,403 A | * | 6/1987 | Bryant | A01F 15/07 100/4 |
| 5,152,123 A | * | 10/1992 | Viaud | A01F 15/0715 100/4 |
| 1,004,764 A1 | | 12/2001 | Schaefer | |
| 6,708,478 B1 | | 3/2004 | Mesmer et al. | |
| 7,404,355 B2 | | 7/2008 | Viaud et al. | |
| 7,937,923 B2 | | 5/2011 | Biziorek | |
| 9,008,920 B1 | * | 4/2015 | Smith | A01F 15/08 53/216 |
| 2001/0056544 A1 | | 12/2001 | Walker | |

(Continued)

FOREIGN PATENT DOCUMENTS

| EP | 2319291 | 5/2011 |
|---|---|---|
| WO | WO2012143389 | 10/2012 |

OTHER PUBLICATIONS

EP15196152.1 European Search Report dated Apr. 26, 2016, 7 pages.

*Primary Examiner* — Khoi Tran
*Assistant Examiner* — Dale Moyer
(74) *Attorney, Agent, or Firm* — Rebecca L. Henkel; Rickard K. DeMille

(57) ABSTRACT

A system is provided that automatically stops a tractor based on position of a twine arm assembly in a round baler. A control system monitors position(s) of the twine arm assembly when an automatic twine-wrapping cycle is initiated. This may include starting a twine arm position monitoring procedure when an initial position change of the twine arms is detected. One or more sensors may be mounted on the baler to detect position characteristics of twine arm assembly, which may include presence or absence of the twine arm assembly at certain locations relative to a bale chamber of the baler and/or movement of the twine arm assembly. When the control system determines that the twine arm assembly is in an insert preparatory position, the control system sends a tractor halt command which automatically stops tractor at the same time that the wrapping procedure begins.

19 Claims, 7 Drawing Sheets

(56) References Cited

U.S. PATENT DOCUMENTS

| | | |
|---|---|---|
| 2002/0029542 A1 | 3/2002 | Davis et al. |
| 2006/0048481 A1* | 3/2006 | Hood .................. A01F 15/0715 53/399 |
| 2007/0175198 A1* | 8/2007 | Viaud ................. A01F 15/0883 56/341 |
| 2011/0112729 A1 | 5/2011 | Martin et al. |
| 2011/0232509 A1 | 9/2011 | Smith |
| 2011/0238269 A1 | 9/2011 | Martin et al. |
| 2013/0116895 A1* | 5/2013 | Smith ..................... A01F 15/08 701/50 |

\* cited by examiner

BALER AUTOMATIC STOPPING SEQUENCE

FIELD OF THE INVENTION

The invention relates generally to agricultural hay and forage equipment such as balers and, in particular, to round balers.

BACKGROUND OF THE INVENTION

Modern farming practices strive to minimize operating expenses and improve working conditions of equipment operators. Improving efficiency of agricultural implements can help reduce operating expenses and reduce manual workload responsibility of equipment operators. To improve efficiency of agricultural implements, various tasks that were manually performed by equipment operators have been automated and synchronized. To improve efficiency while baling crop material such as hay or other forage, efforts have been made to automate and synchronize tractor stopping with bale-wrapping procedures while making cylindrical bales, commonly referred to as round bales, with round balers. It is known to automatically slow a tractor based on a monitored bale size, begin stopping a tractor based on a status of whether wrapping material has moved onto the bale, and begin wrapping the bale after the tractor has stopped. It is also known to provide for operator interaction, for example, to allow the operator to initiate a stop sequence of the tractor after a bale has achieved a target bale size.

SUMMARY OF THE INVENTION

The present invention is directed to a system for coordinating stopping a tractor with wrapping twine onto a round bale of crop material such as hay or other forage with a round baler. The system may reduce operator fatigue by automatically stopping the tractor and may improve productivity by ensuring the tractor stops at the same time as a twine arm (s) reaches an insert portion at which twine can be initially released onto a bale when a wrapping procedure begins. This may allow for beginning the twine wrapping onto a round bale when the tractor initially stops, while preventing crop material from being bound outside of the twine wrapping.

According to one aspect the invention, the system automatically controls a tractor to slow and stop the tractor as a function of a status of a baler. Such status of the baler may include a twine arm insert position event in which a twine arm or twine arm assembly arrives at an insert position for releasing the twine onto a bail during wrapping procedure. This provides a system to ensure synchronization of tractor stopping with starting bale wrapping, while minimizing delay between stopping of the tractor and beginning the wrapping procedure.

According to another aspect of the invention, a baling system automatically stops a tractor based on position of a twine arm assembly in a round baler. The system includes a control system that monitors position (s) of the twine arm assembly when an automatic twine-wrapping cycle is initiated. This may include starting a twine arm position monitoring procedure when an initial position change of the twine arms is detected. One or more sensors may be mounted on the baler to detect position characteristics of twine arm assembly, which may include presence or absence of the twine arm assembly at certain locations relative to a bale chamber of the baler and/or movement of the twine arm assembly. When the control system determines that the twine arm assembly is in an insert preparatory position prior to the insert position, the control system sends a tractor halt command which automatically stops the tractor. In this way, the control system sends the tractor halt command prior to the twine arms getting to the insert position, facilitating synchronization of the tractor coming to a stop at the same time the twine arm (s) get to the insert position. An actual time the tractor halt command is sent may be determined by an estimated stopping time of the tractor based on speed and the amount of time until the twine arms arrive in the insert position from the detected insert preparatory position. This allows for synchronizing bringing the tractor to a complete stop at the same time that twine begins wrapping on the bale during a wrapping procedure.

According to another aspect of the invention, a method for coordinating stopping a tractor with wrapping a bale with twine in a baler includes moving a twine arm assembly from a home position at which the twine arm assembly is arranged with respect to a bale chamber of the baler to allow forming of a bale within the bale chamber to an insert position. Once at the twine arm insert position, the twine arm assembly is arranged with respect to the bale chamber to allow twine to release from the twine arm assembly and apply to the bale during a bale-wrapping procedure. The arrival of the twine arm assembly at an insert preparatory position prior to the twine arm assembly reaching the insert position from the home position is detected. Based on the detection of the arrival of the twine arm assembly at the insert, preparatory position, the tractor is stopped, for example, automatically stopped, so that the bale-wrapping procedure begins substantially simultaneously with the stopping of the tractor.

According to another aspect of the invention, the tractor includes a tractor controller configured for controlling travel speed related operations of the tractor. The baler includes a baler controller configured for controlling bale forming and wrapping related operations. The baler controller sends a tractor halt command signal to the tractor controller for stopping the tractor when the baler controller detects arrival of the twine arm assembly at the insert preparatory position. An initial position change of the twine arm assembly may be detected and, upon detection of the initial position change of the twine arm assembly, the baler controller starts a twine arm position monitoring procedure. During the twine arm position monitoring procedure, the baler controller evaluates arrival of the twine arm assembly at the insert preparatory position.

According to another aspect of the invention, upon detecting the initial position change of the twine arm assembly or detecting that the twine arm assembly is between the home position and the insert preparatory position, the baler controller sends a tractor slow command signal to the tractor for slowing the tractor to a stop preparatory speed. The stop preparatory speed may be about one-half of a baling speed of the baler before the baler controller sent the tractor slow command signal or may be less than about five mph (miles per hour), such as about three mph, or about one mph.

According to another aspect of the invention, the twine arm assembly includes a twine arm drive system. The baler controller detects at movement and/or position of the twine arm assembly by detecting movement and/or position of the twine arm drive system or a component of the twine arm nine drive system. The twine arm drive system may include a plate supporting a twine arm of the twine arm assembly for rotation to move the twine arm during the bale-wrapping procedure. The baler controller may detect at movement and/or position of the plate of the twine arm drive system to determine a corresponding position of the twine arm or twine arm assembly for evaluating arrival at the insert preparatory position.

According to another aspect of the invention, a sensor (s) is mounted to a baler to detect position of the twine arm at any position of its movement. In one embodiment, at least one sensor is mounted in the bale chamber or elsewhere on the baler for detecting a position of the twine arm and sending a corresponding signal to the control system. The sensor may be at least one of a potentiometer, hall-effect sensor, limit switch, magnetic switch, infrared sensor, and ultrasonic sensor sending a signal to the control system corresponding to the arrival of the twine arm assembly at the insert preparatory position, insert position within the bale chamber, or other position of the twine arm assembly during use.

According to another aspect of the invention, the baler controller interrogates a first sensor providing a signal (s) indicating the presence or absence of the twine arm assembly at the home position. Upon receiving a signal indicating absence of the twine arm assembly at the home position, the baler controller begins interrogating a second sensor providing a signal (s) indicating the presence or absence of the twine arm assembly at the insert preparatory position and/or insert position.

According to another aspect of the invention, a baler has a chassis configured for towing behind a tractor and a pickup supported by the chassis and configured to deliver cut crop material into the baler. A bale chamber is configured to receive the cut crop material from the pickup for forming a bale within the bale chamber. The baler has a twine arm assembly that is configured to apply twine onto a bale during a bale-wrapping procedure. The twine arm assembly has a home position at which the twine arm assembly is arranged with respect to the bale chamber to allow forming of the bale within the bale chamber and a twine arm insert position at which the twine arm assembly is arranged with respect to the bale chamber to allow twine to release from the twine arm assembly and onto the bale during the bale-wrapping procedure. The twine arm assembly is movable from the home position to the twine arm insert position during a preliminary step to prepare the baler for the wrapping procedure. At least one sensor is arranged for detecting a position of the twine arm assembly. The at least one sensor may include an insert position sensor configured to send a signal indicating a presence of the twine arm assembly at the twine arm insert position and may include a home position sensor configured to send a signal indicating an absence of the twine arm assembly at the home position. The insert position sensor and/or the home position sensor may also detect and send a signal (s) corresponding to any position of the twine arm assembly, including the twine arm assembly reaching the insert preparatory position, the insert position, and/or the home position. A control system receives a signal from the at least one sensor corresponding to the detection of the twine arm assembly arriving at the insert position. The control system stops the tractor based on the detection of the arrival of the twine arm assembly at the insert preparatory position. The control system may command adjustment of the speed of the twine arms as they approach the insert position so that they arrive at the insert position at essentially the same time the tractor comes to a stop. This allows the bale-wrapping procedure to begin substantially simultaneously with the stopping of the tractor.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
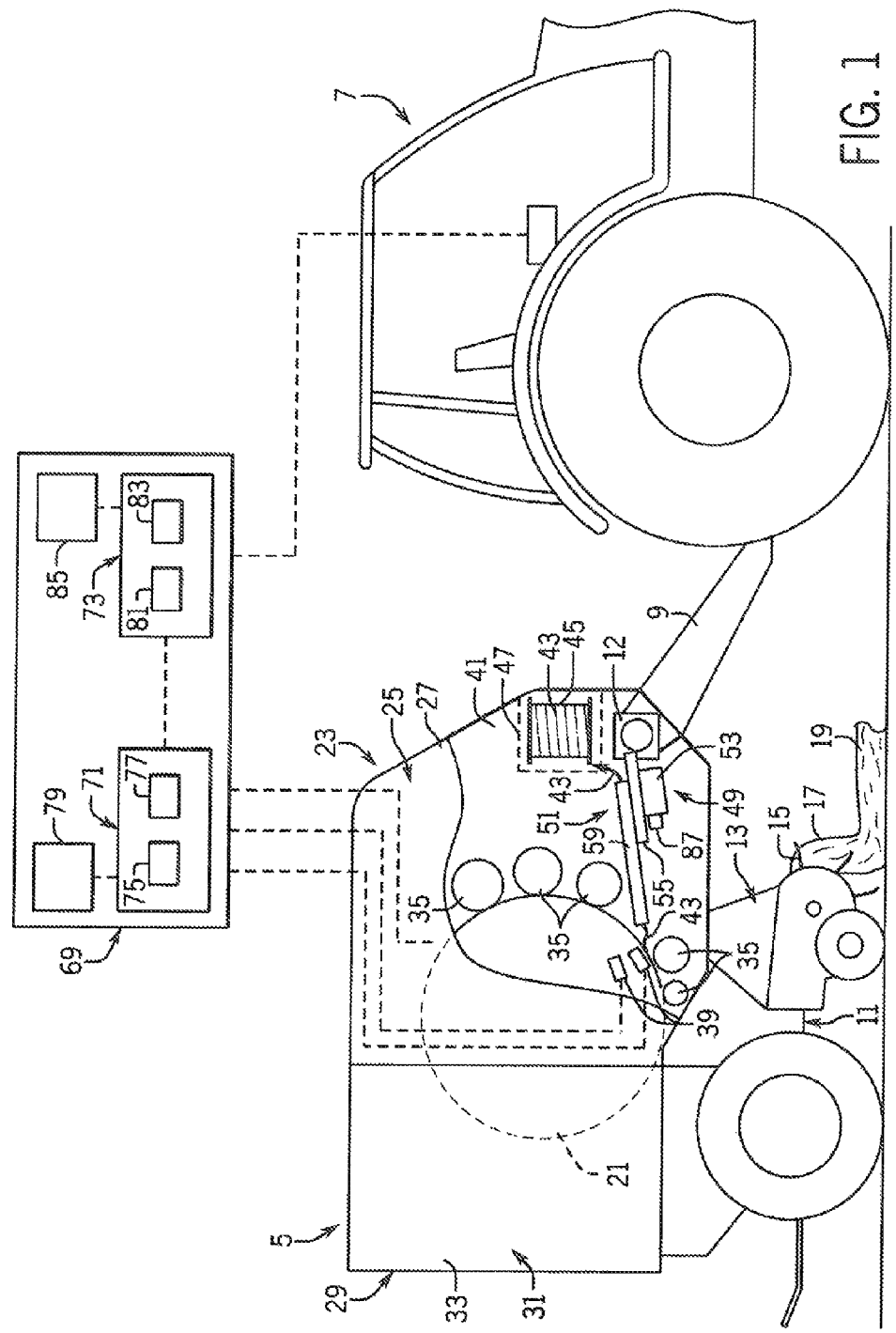
FIG. 1 is a simplified partially schematic side elevation of a tractor and a round baler.

Referring now to the drawings and specifically to FIG. 1, an agricultural implement, namely, a baler, is shown as a round baler 5 that is towed behind a tractor 7 by way of a hitch 9 extending from a chassis 11 of the baler 5. The baler 5 may be any of a variety of round balers configured for automatic baling, for example, one of the RB4 series of round balers, such as an RB444, RB454, RB464, RB554, or RB564 round baler available from Case IH. A pickup 13 is arranged toward a front end of the baler 5 and extends downwardly from the chassis 11. The pickup 13 has tines 15 that rotate to collect cut crop material 17 from a windrow 19 for delivery into a bale chamber 21. The bale chamber 21 is provided in an enclosure 23 defined by a front portion 25 having interconnected walls 27. Toward a back end of the baler 5, a back portion 29 of the enclosure 23 defines a tailgate 31 having interconnected walls 33 and that is arranged with respect to the front portion 25 of the enclosure 23 to pivot and raise open for ejecting a bale from the baler 5. Inside the enclosure 23, a series of belts (not shown) is supported for traveling along a path that partially defines the bale chamber 21, such as at a rear-facing portion of the bale chamber 21, to accommodate rolling of the bale while controlling the cylindrical bale shape as the bale grows within the bale chamber 21. Multiple rollers 35 are arranged at a forward-facing portion of the bale chamber 21. The rollers 35 may include, for example, a powered floor roll to support the weight of the bale as it is being formed, a starter roll for beginning bale formation in working with the belts to grow the bale shape, a fixed roll to assist with core formation of the bale, and pivot and ribbed stripper rolls to assist with bale formation and maintaining bale shape.

During bale formation, a size (s) of a bale 37 may be detected by one or more bale size sensors 39 arranged with respect to the bale chamber 21 for sensing the size of the bale 37 during its formation.

Figure 2:
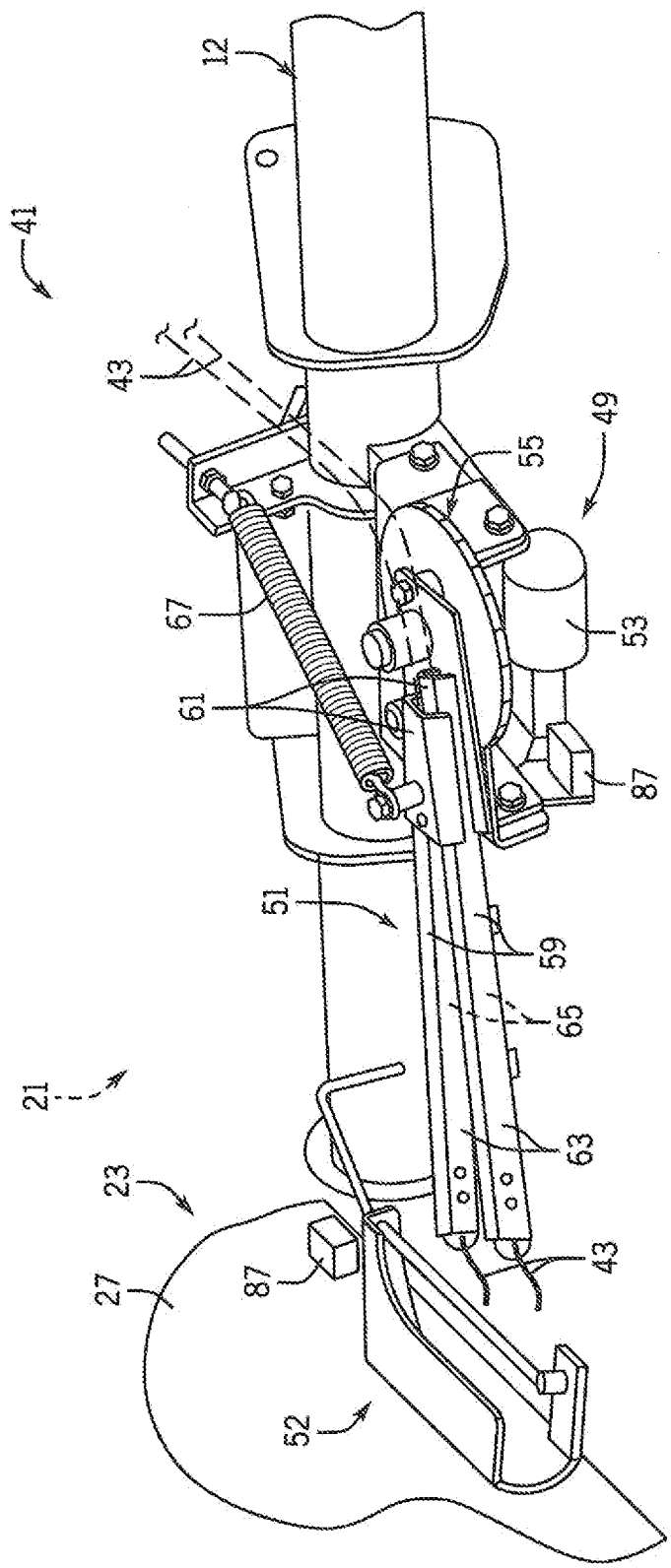
FIG. 2 is a simplified partially schematic pictorial view of a twine-wrapping system of the baler of FIG. 1.

Still referring to FIG. 1, a wrapping system shown here as a twine-wrapping system 41 is arranged within the enclosure 23 for wrapping twine 43 onto fully formed bales 37. The twine 43 is stored on a spool commonly referred to as a ball 45 toward the front of the enclosure 23 in a twine box 47. A cross member 12 of a frame of the chassis 11 supports various components of the twine-wrapping system 41, such as a twine arm drive system 49 that moves a twine arm assembly 51 back-and-forth along the width of the bale chamber 21 to apply the twine 43 onto the bale 37 when the bale 37 has achieved full size according to a predetermined twine-tie pattern (s) programmed or stored in a baler controller, explained in greater detail elsewhere herein. Referring now to FIG. 2, a twine-cutting system 52 is arranged within the enclosure 23 and is configured to cut the twine 43 after a wrapping procedure is completed. The twine-cutting system 52 is shown here as being supported by the wall 27, although it is understood that the twine-cutting system 52 may be otherwise supported by the baler 5.

Still referring to FIG. 2, the twine arm drive system 49 includes an actuator shown as motor 53 that rotates a plate 55 through a sprocket and chain system having a driven sprocket that may be mounted below and connected to the plate 55, and a driving sprocket that may be mounted to an output shaft of the motor 53 or to an output shaft of a gear train receiving power from the motor 53. The motor 53 may be an electric or hydraulic motor controlled by the control system. The sprocket and chain system interconnects the motor 53 and plate 55 so that rotation of the output shaft of the motor 53 is translated into movement of the plate 55. The plate 55 supports the twine arm assembly 51, which includes a pair of twine arms 59 that move in unison with the plate 55. Each twine arm 59 has a first end shown as inner end 61 supported by the plate 55, a second end shown as outer end 63, and a longitudinally extending passage 65 extending between the inner and outer ends 61, 63 through which the twine 43 extends from the ball 45 to the bale 37. A spring 67 connects the twine arm assembly 51 to the cross member 12 to stably retain the twine assembly 51 in a home position when the twine 43 is not being dispensed from the wrapping system 41.

Referring again to FIG. 1, movement and monitoring of the wrapping system 41 is controlled by way of a control system 69. Control system 69 includes a baler controller 71 and a tractor controller 73 that operably communicate with each other, for example, by way of an ISOBUS connection, for coordinating controls of the baler 5 and tractor 7 based on the baling activity and status of the systems and operations within the baler 5. The baler controller 71 is configured for controlling operations of the baler 5, including controlling bale forming and wrapping-related operations of the baler 5. The baler controller 71 includes a controller 75 and power supply 77, as is known in automatic round balers, for controlling the functions of the baler 5 by controlling the various electronic actuators, hydraulic systems, and/or other systems of the baler 5. The controller 75 can include an industrial computer or, e.g., a programmable logic controller (PLC), along with corresponding software and suitable memory for storing such software and hardware, including interconnecting conductors for power and signal transmission for controlling electronic, electro-mechanical, and hydraulic components of the baler 5. A baler interface system 79 is operably connected to the baler controller 71 and includes a monitor and various input devices to allow an operator to see the statuses and control various operations of the baler 5, for example, from within a cab of the tractor 7. The baler interface system 79 may be a Deluxe Control Monitor™ interface available for use with RB4 series of round balers from Case IH. The tractor controller 73 is configured for controlling operations of the tractor 7 such as controlling travel speed-related operations of the tractor 7, including controlling speed, braking, shifting, and other operations of the tractor 7. The tractor controller 73 includes a controller 81 and power supply 83, as is known, for controlling the functions of the tractor 7 by controlling the various transmission, engine, hydraulic, and/or other systems of the tractor 7. Like the controller 75 of the baler controller 71, the controller 81 of the tractor controller 73 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the tractor 7. A tractor interface system 85 is operably connected to the tractor controller 73 and includes a monitor and various input devices to allow an operator to see the statuses and control various operations of the tractor 7 from within the cab of the tractor 7. The tractor interface system 85 may be a MultiControl Armrest™ console available for use with the Maxxum™ or Magnum™ series tractors from Case IH.

Referring again to FIG. 2, one or more sensors 87 are mounted on the baler 5, such as in or near the hale chamber 21 or elsewhere on the baler 5, to detect position characteristics of twine arm assembly 51. The position characteristics of the twine arm assembly 51 may include presence or absence of the twine arm assembly 51 at certain locations and/or movement of the twine arm assembly 51 relative to the bale chamber 21. The control system 69 uses signals from the sensor (s) 87 to control the tractor 7 for synchronizing bringing the tractor 7 to a complete stop at the same time that twine begins wrapping on the bale 37 during a bale twine-wrapping procedure. The sensor 87 may be at least one of a potentiometer, hall-effect sensor, limit switch, magnetic switch, infrared sensor, and ultrasonic sensor sending a signal to the control system 69 corresponding to position characteristics of twine arm assembly 51. In one embodiment, a single sensor 87 is provided arranged adjacent the motor 53 as a potentiometer with an input shaft rotated by an arm connected to and moved by movement of the plate 55 to provide a signal corresponding to rotational position of the plate 55 and thus the location or position of the twine arms 59 within the bale chamber 21.

Figure 3:
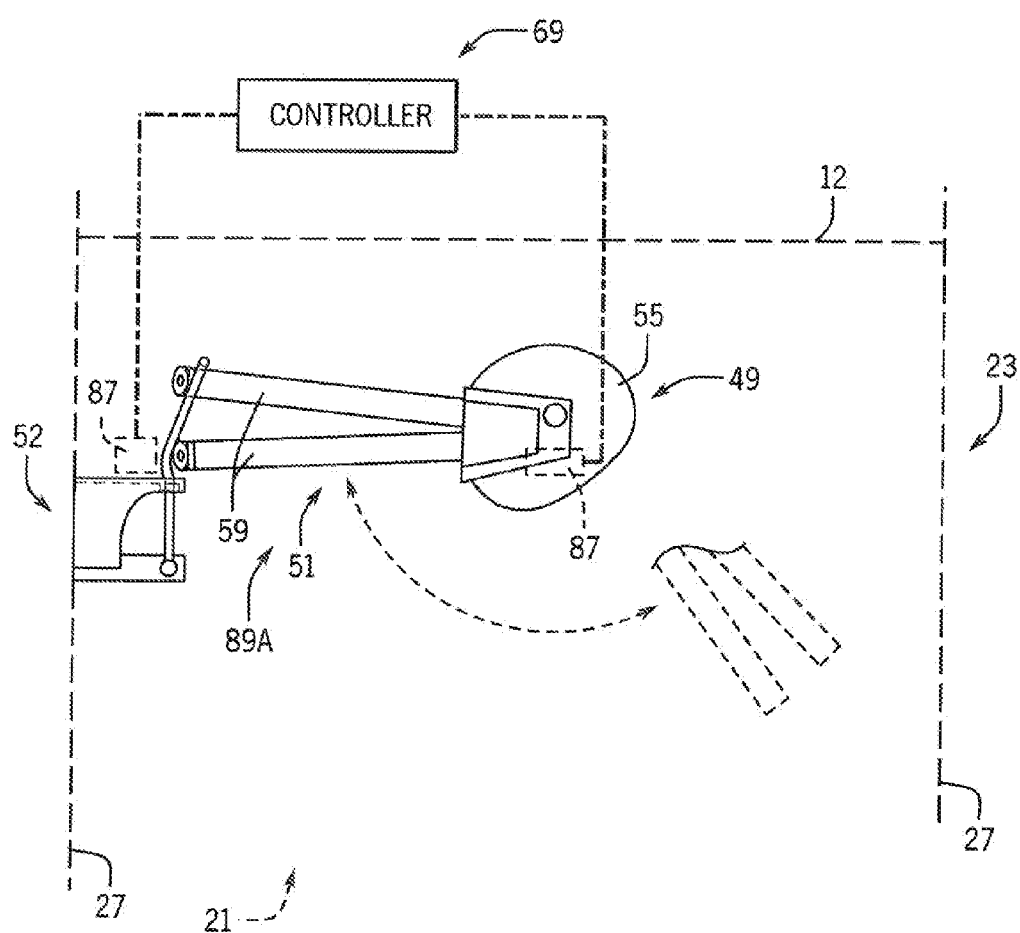
FIG. 3 is a simplified partially schematic top plan view of a twine-wrapping system of the baler of FIG. 1 in a home position.

Referring now to FIG. 3, the twine arm assembly 51 and thus the twine arms 59 are shown in a home position 89A in its solid line representation toward the left-hand side. The home position 89A is one of the extreme positions of the range of movement of the twine assembly 51 at which the twine arm assembly 51 is inactive or a resting state while the bale 37 is being formed within the bale chamber 21. The home position 89A is also the location at which the twine arm assembly 51 sits while the twine-cutting system 52 cuts the strands of twine 43 from the ends of the twine arms 59 at the end of a wrapping cycle or procedure. The dashed-line representation of the twine arms 59 toward the right-hand side shows the twine arms 59 and thus the twine arm assembly 51 in an opposite extreme position of the range of movement, farthest from the home position.

Figure 4:
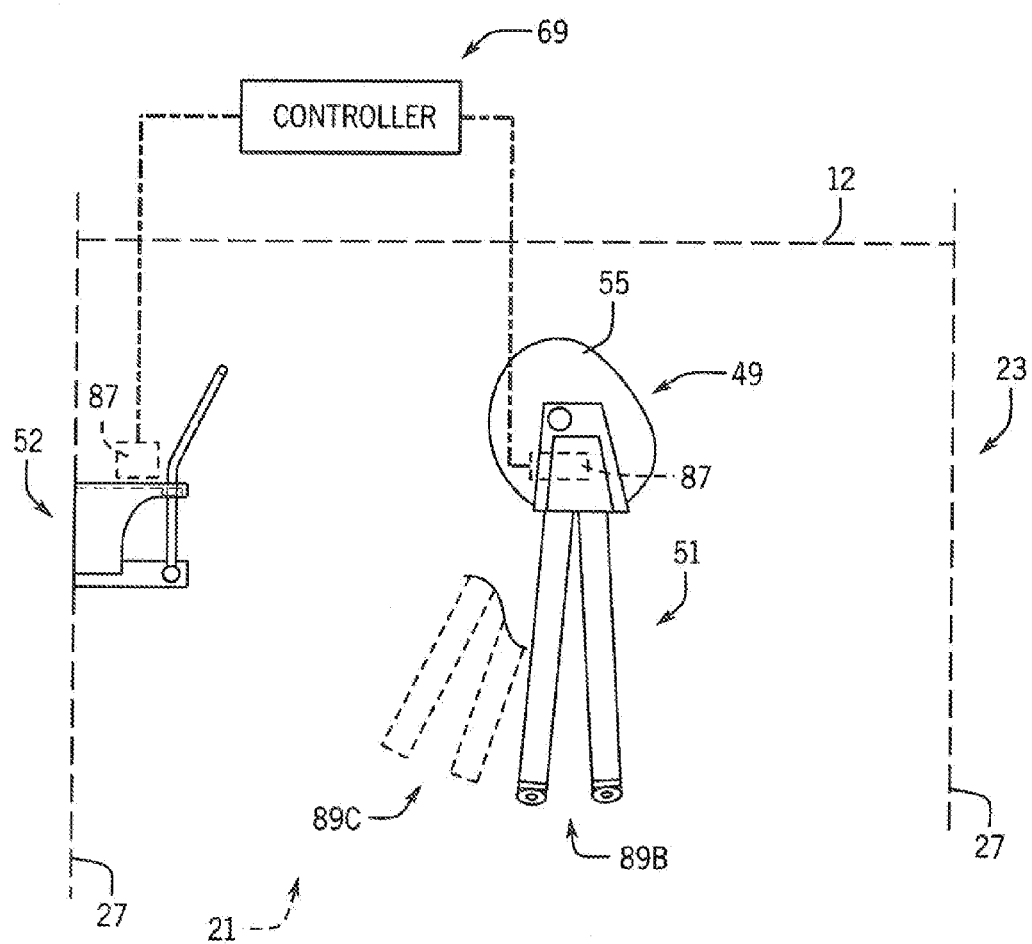
FIG. 4 is a simplified partially schematic top plan view of a twine-wrapping system of the baler of FIG. 1 in an insert position.

Referring now to FIG. 4, the twine arm assembly 51 and thus the twine arms 59 are shown in an insert position 89B.

In the insert position 89B, the twine arms 59 extend furthest into the bale chamber 21, shown as generally parallel to the walls 27 of the enclosure 23 and generally orthogonal with respect to the cross member 12 of the frame of the chassis 11 (FIG. 1). The insert position 89B presents the outer ends 63 of the twine arms 59 to expose the strands of twine 43 (FIG. 2) for insertion into the bale chamber 21 and application of the twine 43 onto the bale 37 during the bale-wrapping procedure that occurs when the bale 37 is fully formed and thus full size. The insert position 89B is typically the first position to which the baler controller 71 moves the twine arm assembly 51 after the home position 89A in preparation for the wrapping procedure or cycle. From the home position 89A (FIG. 3), when moving toward the insert position 89B, the twine arm assembly 51 and thus the twine arms 59 reach an insert preparatory position 89C prior to the twine arms 59 reaching the insert position 89B, as represented by the dashed-line representation of the twine arms 59 shown to the left of the insert position 89B. The insert preparatory position 89C is located a predetermined distance from the insert position 89B. The distance between the insert preparatory position 89C and the insert position 89B corresponds to a distance traveled by the twine arms 59 during a predetermined stopping strategy from the control system 69 from a typical baling speed to a gradual halt without imparting uncomfortable forces to the operator such as hard-stopping induced lurching. The distance between the insert preparatory position 89C and the insert position 89B may correspond to a distance traveled by the twine arms 89C in about two seconds during which time the control system 69 commands a gradual deceleration of the tractor 7 from about five mph to zero mph. This can be predetermined according to a percentage of travel range of motion, a swept distance, a timer, or the like. The control system 69 can evaluate both the speed of the tractor 7 and the position of the twine arms 59 and control the speed of movement of the twine arms 59 to actively adjust twine arm (s) 59 movement speed to coordinate simultaneous arrival of the twine arms 59 at the insert position 59B with the tractor 7 initially achieving a complete stop, as explained in greater detail elsewhere herein.

Figure 5:
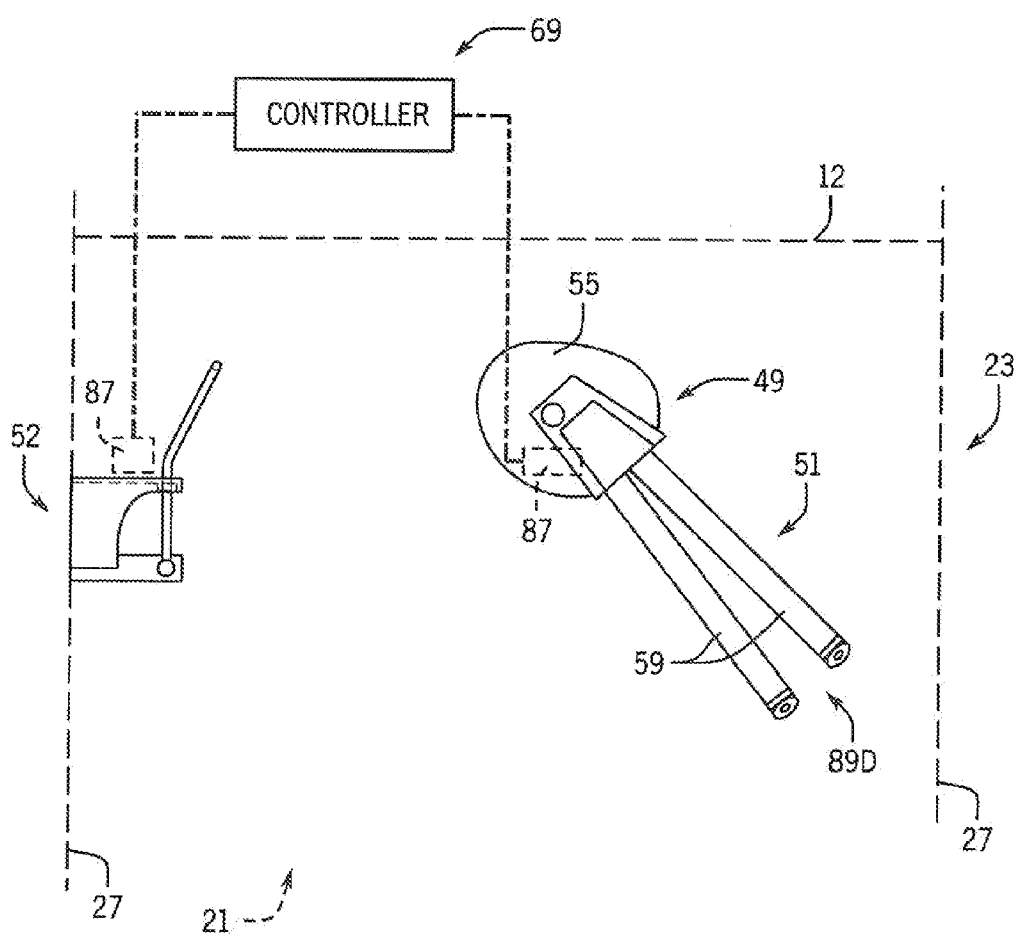
FIG. 5 is a simplified partially schematic top plan view of a twine-wrapping system of the baler of FIG. 1 in a first end wrap position.

Referring now to FIG. 5, the twine arm assembly 51 and thus the twine arms 59 are shown in a first end wrap position 89D. In the first end wrap position 89D, the twine arms 59 extend furthest across the bale chamber 21 shown extending angularly toward the wall 27 at the right-hand side. The first end wrap position 89D presents the outer ends 63 of the twine arms 59 to expose the strands of twine 43 for application onto an end of the bale 37 that is furthest from the twine-cutting system 52. In some embodiments, the first end wrap position 89D is the first end position to which the baler controller 71 moves the twine arm assembly 51 when moving the twine arm assembly 51 away from the insert position 89B during the wrapping cycle.

Figure 6:
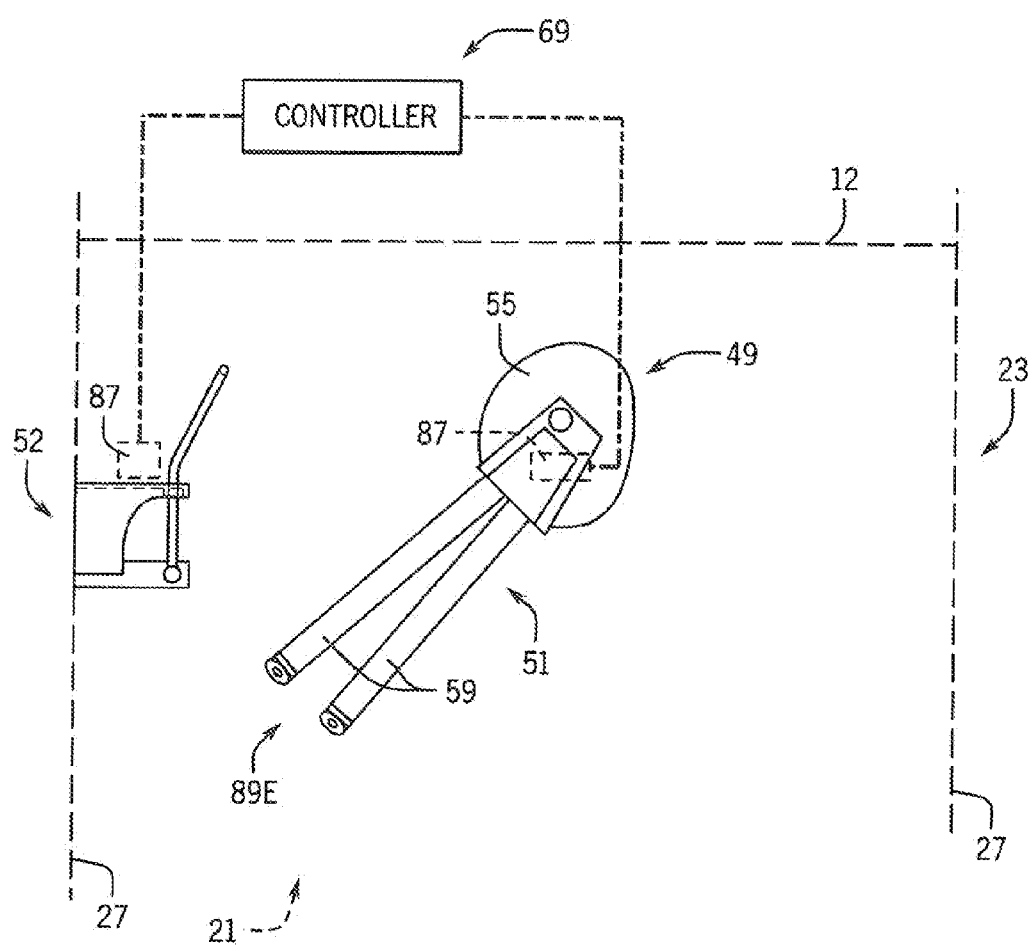
FIG. 6 is a simplified partially schematic top plan view of a twine-wrapping system of the baler of FIG. 1 in a second end wrap position.

Referring now to FIG. 6, the twine arm assembly 51 and thus the twine arms 59 are shown in a second end wrap position 89E. In the second end wrap position 89E, the twine arms 59 extend farthest across the bale chamber 21 shown extending angularly toward the wall 27 at the left-hand side. The second end wrap position 89E presents the outer ends 63 of the twine arms 59 to expose the strands of twine 43 for application onto an end of the bale 37 that closest to the twine-cutting system 52. In some embodiments, the second end wrap position 89E is the final position to which the baler controller 71 moves the twine arm assembly 51 before demanding the return of the twine arm assembly 51 to the home position 89A upon completion of the wrapping cycle.

Referring now to FIGS. 3-6, the control system 69 controls movement and monitors position of the twine arm assembly 51 and/or its components by way of the sensor (s) 87 to control the tractor 7 for synchronizing bringing the tractor 7 to a complete stop at the same time that twine begins wrapping on the bale 37 during a bale twine-wrapping procedure. This is done by identifying when the twine assembly 51 arrives at its insert preparatory position 89C (FIG. 4) and correspondingly issues a tractor halt command before the twine assembly 51 reaches the insert position 89B and can correspondingly adjust the twine arm 59 speed to have the tractor 7 come to a stop and the twine arms 59 arrive at the insert position 89B at the same time.

Figure 7:
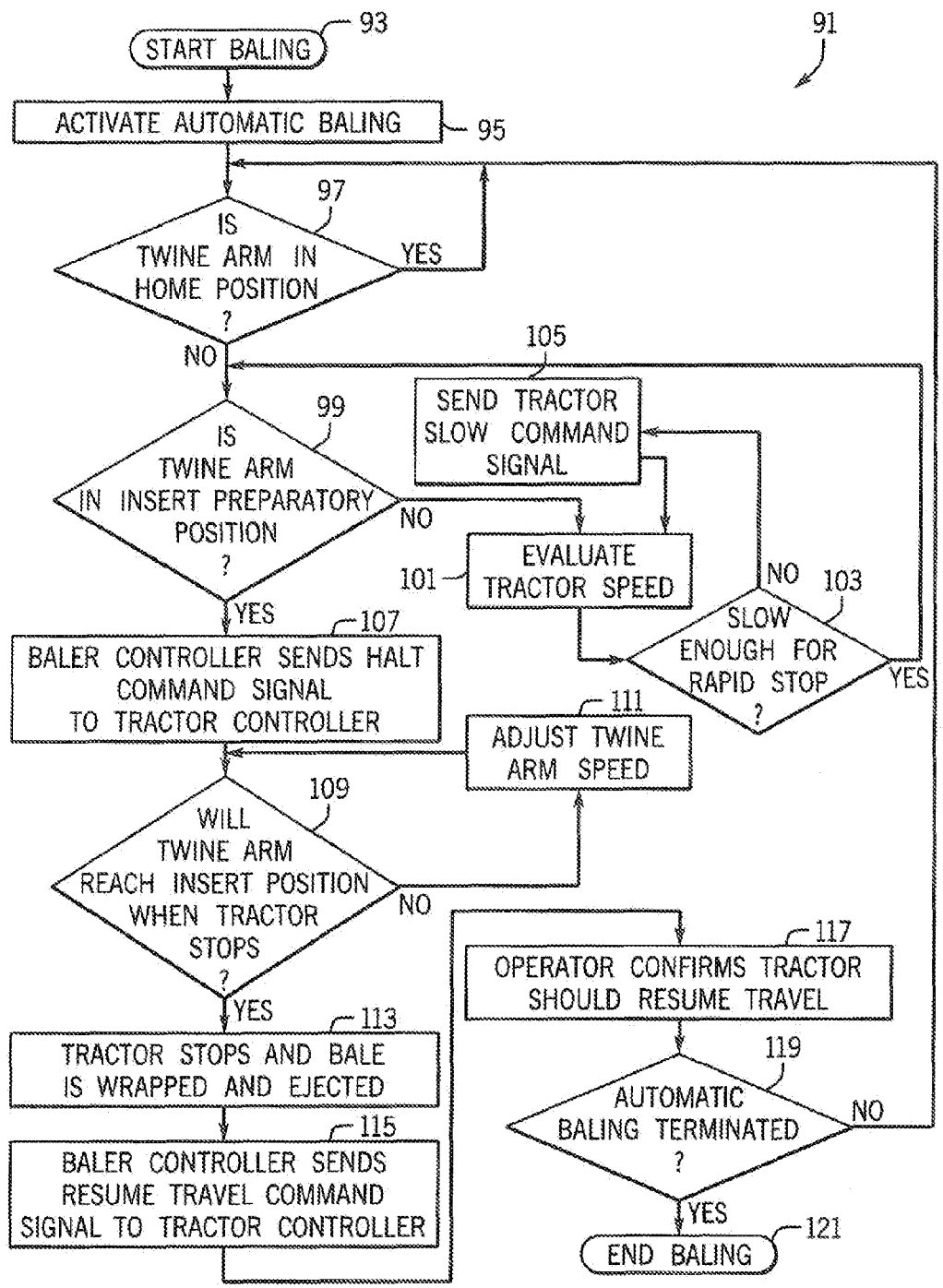
FIG. 7 illustrates a schematic representation of a method for coordinating stopping a tractor with wrapping a bale with twine in a baler.

Referring now to FIG. 7 and with further reference to FIGS. 1 and 2, a flowchart of one embodiment of a method for coordinating automatically stopping a tractor with wrapping a bale with twine in a baler by way of control system 69 is shown as represented by numeral 91. At step 93, baling starts and a tractor 7 is driven that tows a baler 5 while aligning the baler 5 with respect to a windrow 19 of cut crop material 17 for automatically forming a bale 37 with the baler 5. At step 95, the operator activates an automatic baling procedure of the baler 5, by way of the baler interface system 79 (FIG. 1). Starting at step 97, the control system 69 monitors a position (s) of the twine arm assembly 51 when an automatic twine-wrapping cycle is initiated. This may include starting a procedure to monitor the twine arm position (s) when an initial position change of the twine arms 59 is detected. At steps 97 and 99, if the control system 69 determined that the twine arm (s) 59 is no longer in the home position 89A (FIG. 3), then the position (s) of the twine arm (s) 59 is monitored. At step 99, if the twine arm (s) 59 has not yet arrived at the insert preparatory position 89C (FIG. 4), then in some embodiments, the control system 69 can perform a tractor speed evaluation and initial slowing as represented at steps 101, 103, and 105. In this way, while the twine arm (s) 59 is moving from the home position 89A (FIG. 3) or upon initial detection of movement of the twine arm (s) 59 away from the home position 89A, the control system 69 determines whether the current tractor speed is slow enough for a rapid stop. This may include the control system 69 using a lookup table or otherwise determining whether the tractor can be brought to a complete stop in less than about two seconds or less than about one second, without causing substantial rocking or surging within the baler 5 to compromise initiation of the wrapping sequence such as misalignment of the strands of twine 43 allowing the baled crop material to noticeably fray out of the bail or be bound outside the twine 43 and/or to maintain operator comfort without subjecting the operator to harsh braking. At step 103, if the control system 69 determines that the tractor speed is slow enough to be able to perform a rapid stop, then the signal from the sensor (s) 87 is again evaluated to determine if the twine arm (s) 59 has arrived at the insert preparatory position 89C. If the tractor speed is not slow enough to be able to perform a rapid stop, then the control system 69 commands the tractor to slow to a stop preparatory speed, which is sufficiently slow to perform a rapid stop. This may be done by the baler controller 71 sending a slow command signal to the tractor controller 73 to achieve the stop preparatory speed. The stop preparatory speed may be about one-half of a baling speed of the baler before the baler controller sent the tractor slow command signal or may be less than about five mph, such as about three mph, or about one mph.

Still referring to FIG. 7 with further reference to FIGS. 1 and 2, referring again to step 99 and also to step 107, when the control system 69 determines that the twine arm (s) 59 has arrived at the insert preparatory position 89C (FIG. 4), the baler controller 71 sends a tractor halt command signal to the tractor controller 73 that executes a deceleration protocol which stops the tractor 7. As represented at block 109, the control system 69 determines whether the twine arm (s) 59 will reach the insert position 89B at the same time that the tractor stops. This can be done by evaluating conditions or statuses of the tractor 7 and twine arm (s) 59, which may include comparing the speed of the tractor with the position and movement speed of the twine arm (s) 59 and calculating or using a lookup table (s) to determine if the twine arm (s) 59 will reach the insert position 89B before, after, or simultaneously with the tractor achieving a zero mph speed. If the control system 69 determines that the twine arm (s) 59 will reach the insert position 89B before or after the tractor 7 stops, then, the control system 69 adjusts the twine arm speed by commanding the twine arm drive system 49 to decrease or increase the movement speed of the twine arm (s) 59 through the bale chamber 21, as represented at block 111. Then the control system 69 again evaluates speed of tractor 7 and position and speed of the twine arm (s) 59 to determine whether the twine arm (s) 59 will reach the insert position 89B at the same time or before or after the tractor stops at block 109. The control system 69 can control the speed of twine arm movement with different tolerances for pre-stopping and post-stopping insertion of twine. The control system 69 can control movement of the twine arm (s) 59 to ensure that the twine arm (s) 59 reaches the insert position 89B at or within a predetermined acceptable time after the moment at which the tractor 7 achieves its complete stop, for example, within no more than about two seconds from the tractor decelerating to zero mph. As represented at step 113, a bale-wrapping procedure begins that occurs substantially simultaneously, for example, within less than about five seconds or less than about one second of the control system detecting the arrival of the twine arm (s) 59 at the insert position 89B (FIG. 4) and the stopping of the tractor 7, such as when the tractor initially achieves the complete stop. Still referring to step 113, the tractor 7 stops and the bale 37 is wrapped according to a predetermined twine-tie pattern (s) programmed or stored in the baler controller 71 that controls movement of the twine arm (s) 59 back-and-forth along the bale 37, from the insert position 89B (FIG. 4) to and between the end wrap positions 89D (FIG. 5), 89E (FIG. 6) to produce a predetermined crisscross overlapping and/or other pattern of the strands of twine 43 to hold the bale 37 bound in its cylindrical or round form. Then the bale 37 is ejected from the baler 5. At step 115, the baler controller 71 sends a resume-travel command signal to the tractor controller 73. This is indicated to the operator through the baler or tractor interface systems 79, 85 and the operator confirms through the baler or tractor interface system 79, 85 that the tractor 7 should resume travel at step 117. At step 117, automatic baling can resume, for example, as permitted by the operator through the baler interface system 79 to confirm that automatic baling should not be terminated. The control system 69 returns to step 97 to determine whether the twine arm (s) 59 has moved from the home position 89A (FIG. 3) at which point the control system 69 again monitors the position (s) and/or movement of the twine arm assembly 51. If automatic baling does not resume at step 119, then the automatic baling is terminated and the baling session ends at step 121.

Many changes and modifications could be made to the invention without departing from the spirit thereof. The scope of these changes will become apparent from the appended claims.

We claim:

1. A method for coordinating stopping a tractor simultaneously with wrapping a bale with twine in a baler while operating a tractor to move the baler with respect to a windrow of cut crop material for picking up the cut crop material with the baler, the method comprising:
    moving a twine arm assembly from a home position at which the twine arm assembly is arranged with respect to a bale chamber of the baler to allow forming of a bale within the bale chamber to an insert position at which the twine arm assembly is arranged with respect to the bale chamber to allow twine to release from the twine arm assembly and apply to the bale during a bale-wrapping procedure;
    detecting arrival of the twine arm assembly at an insert preparatory position prior to the twine arm assembly reaching the insert position from the home position;
    sending a tractor halt command based on the detection of the arrival of the twine arm assembly at the insert preparatory position;
    stopping the tractor in response to the tractor halt command, wherein the tractor stops substantially simultaneously with the arrival of the twine arm assembly at the insert position and the beginning of the bale-wrapping procedure.

2. The method of claim 1, wherein the tractor includes a tractor controller configured for controlling travel speed related operations of the tractor and the baler includes a baler controller configured for controlling bale forming and wrapping-related operations, wherein the baler controller sends the tractor halt command signal to the tractor controller for decelerating to begin stopping the tractor when the baler controller detects arrival of the twine arm assembly at the insert preparatory position, and wherein while the tractor is decelerating, the control system controls speed of movement of the twine arm assembly while the twine arm assembly moves from the insert preparatory position to the insert position to synchronize arrival of the twine arm assembly at the insert position with the tractor initially reaching a complete stop.

3. The method of claim 2, further comprising detecting an initial position change of the twine arm assembly and starting a twine arm position monitoring procedure upon detection of the initial position change of the twine arm assembly, wherein the baler controller evaluates arrival of the twine arm assembly at the insert preparatory position during the twine arm position monitoring procedure.

4. The method of claim 3, wherein upon detecting the initial position change of the twine arm assembly, the baler controller sends a tractor slow command signal to the tractor for slowing the tractor to a stop preparatory speed.

5. The method of claim 3, wherein the baler controller detects that the twine arm assembly is between the home position and the insert preparatory position and sends a tractor slow command signal to the tractor controller for slowing the tractor to a stop preparatory speed.

6. The method of claim 3, wherein the baler controller interrogates a first sensor providing a signal indicating the presence or absence of the twine arm assembly at the home position and, upon receiving a signal indicating absence of the twine arm assembly at the home position, the baler controller begins interrogating a second sensor providing a signal indicating the presence or absence of the twine arm assembly at the insert preparatory position.

7. The method of claim 2, wherein the twine arm assembly includes a twine arm drive system and wherein the baler controller detects at least one of movement and position of the twine arm assembly by detecting at least one of movement and position of the twine arm drive system.

8. The method of claim 7, wherein the twine arm assembly includes a twine arm and the twine arm drive system includes a plate supporting the twine arm for rotation to move the twine arm during the bale-wrapping procedure and wherein the baler controller detects at least one of movement and position of the plate of the twine arm drive system.

9. The method of claim 2, wherein the twine arm assembly includes a twine arm and at least one sensor is mounted on the baler for detecting a position of the twine arm and sending a corresponding signal to the control system.

10. The method of claim 9, wherein the sensor is at least one of a potentiometer, hall-effect sensor, limit switch, magnetic switch, infrared sensor, and ultrasonic sensor sending a signal to the control system corresponding to the arrival of the twine arm assembly at the insert preparatory position within the bale chamber.

11. A method for coordinating stopping a tractor simultaneously with wrapping a bale with twine in a baler while operating a tractor to move a baler with respect to a windrow of cut crop material for picking up the cut crop material with the baler, the method comprising:
controlling travel speed-related operations of a tractor and bale forming and wrapping-related operations of a baler with a control system;
moving a twine arm from a home position at which the twine arm is arranged with respect to a bale chamber of the baler to allow forming of a bale within the bale chamber to a twine arm insert position allowing twine to release from the twine arm assembly and apply to the bale during a bale-wrapping procedure;
detecting when the twine arm arrives at an insert preparatory position prior to the twine arm assembly reaching the twine arm insert position; and
automatically stopping the tractor based on the detection of the arrival of the twine arm assembly at the insert preparatory position, wherein the bale-wrapping procedure begins substantially simultaneously with the stopping of the tractor.

12. The method of claim 11, wherein a baler controller configured for controlling bale forming and wrapping-related operations receives a signal from a sensor corresponding to the twine arm arriving at the twine arm insert preparatory position, wherein the baler controller sends a tractor halt command signal to a tractor controller configured for controlling travel speed related operations of the tractor to stop the tractor when the bale-wrapping procedure begins, and wherein the control system controls speed of movement of the twine arm assembly while the twine arm assembly moves from the insert preparatory position to the insert position to synchronize arrival of the twine arm assembly at the insert position with the tractor stopping.

13. The method of claim 12, wherein the baler controller detects that the twine arm is between the home position and the insert preparatory position and sends a tractor slow command signal to the tractor controller reducing the tractor from a baling speed to a stop preparatory speed that is relatively slower than the baling speed.

14. The method of claim 11, wherein the baler controller receives a signal from a sensor mounted on the baler indicating arrival of the twine arm at the twine arm insert preparatory position.

15. A baler, comprising:
a chassis configured for towing behind a tractor;
a pickup supported by the chassis and configured to deliver cut crop material into the baler;
a bale chamber configured to receive the cut crop material from the pickup for forming a bale within the bale chamber;
a twine arm assembly configured to apply twine onto a bale during a bale-wrapping procedure, the twine arm assembly movable from a home position at which the twine arm assembly is arranged with respect to the bale chamber to allow forming of the bale within the bale chamber to a twine arm insert position at which the twine arm assembly is arranged with respect to the bale chamber to allow twine to release from the twine arm assembly and onto the bale during the bale-wrapping procedure;
at least one sensor arranged for detecting a position of the twine arm assembly; and
a control system receiving a signal from the at least one sensor corresponding to the detection of the twine arm assembly arriving at an insert preparatory position prior to the twine arm assembly reaching the insert position and stopping the tractor based on the detection of the arrival of the twine arm assembly at the insert preparatory position, wherein the bale-wrapping procedure begins substantially simultaneously with the stopping of the tractor.

16. The baler of claim 15, wherein the control system includes a baler controller configured for controlling bale forming and wrapping-related operations and a tractor controller configured for controlling travel speed related operations of the tractor, wherein the baler controller receives a signal from the at least one sensor corresponding to the twine arm assembly arriving at the twine arm insert preparatory position, and wherein the baler controller sends a tractor halt command signal to the tractor controller to stop the tractor when the bale-wrapping procedure begins.

17. The baler of claim 16, wherein when the baler controller detects that the twine arm assembly is between the home position and the insert preparatory position, the baler controller sends a tractor slow command signal to the tractor controller reducing the tractor from a baling speed to a stop preparatory speed that is relatively slower than the baling speed.

18. The baler of claim 15, wherein the at least one sensor includes an insert position sensor configured to send a signal indicating a presence of the twine arm assembly at the twine arm insert position.

19. The baler of claim 18, wherein the at least one sensor includes a home position sensor configured to send a signal indicating an absence of the twine arm assembly at the home position.

* * * * *